United States Patent [19]

Kobayashi et al.

[11] Patent Number: 4,697,906

[45] Date of Patent: Oct. 6, 1987

[54] ELECTRIC FLASH DEVICE

[75] Inventors: Takashi Kobayashi; Yuji Maruyama, both of Suita, Japan

[73] Assignee: West Electric Company, Ltd., Osoki, Japan

[21] Appl. No.: 912,000

[22] Filed: Sep. 26, 1986

[30] Foreign Application Priority Data

| | | | |
|---|---|---|---|
| Sep. 27, 1985 | [JP] | Japan | 60-215439 |
| Jul. 22, 1986 | [JP] | Japan | 61-172086 |

[51] Int. Cl.[4] .......... H05B 41/00; G03B 15/05

[52] U.S. Cl. .......... 354/416; 315/241 P

[58] Field of Search .......... 354/416; 315/241 P

[56] References Cited

U.S. PATENT DOCUMENTS 4,457,611 7/1984 Ishida et al. .......... 354/415

*Primary Examiner*—Michael L. Gellner

*Attorney, Agent, or Firm*—Cushman, Darby & Cushman

[57] ABSTRACT

An electric flash device for photography is controlled of its light radiation of a flash tube by a transistor, which is connected in series with the flash tube and is given its base current through a parallelly connected capacitor and resistor, and when the transistor turns OFF, an electric charge stored in the capacitor is applied across the base and the emitter of the transistor as a reverse bias.

11 Claims, 20 Drawing Figures

FIG.1
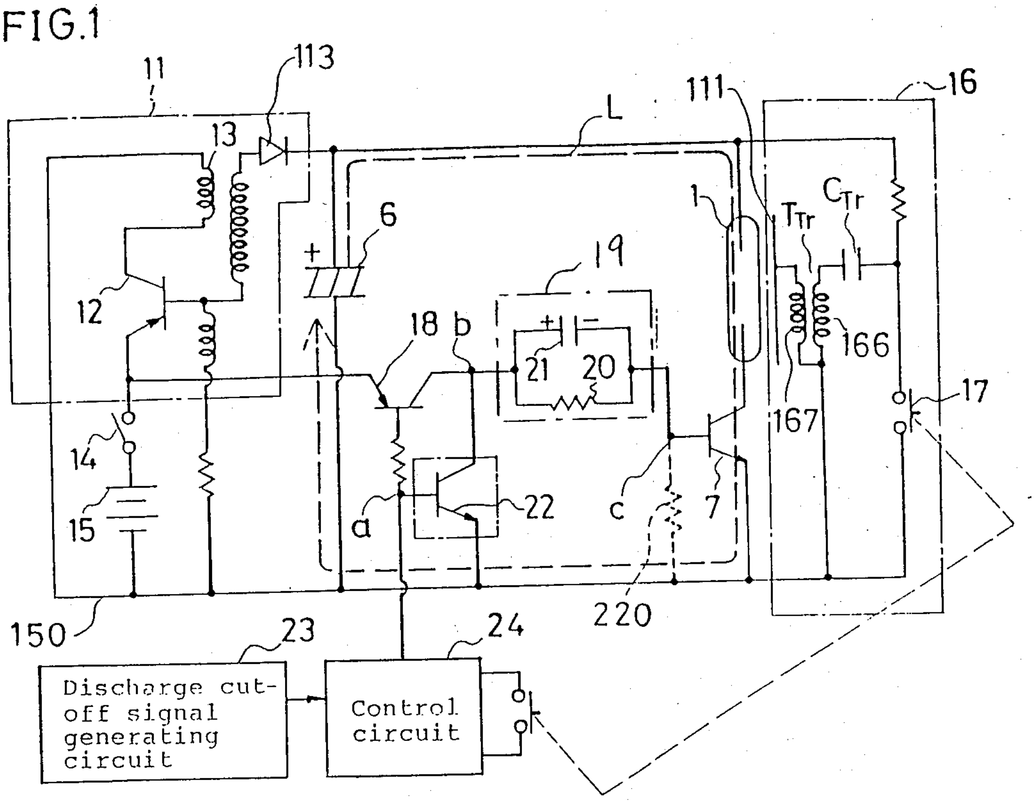
FIG.2(a)
FIG.2(b)
FIG.2(c)
FIG.2(d)
FIG.2(e)
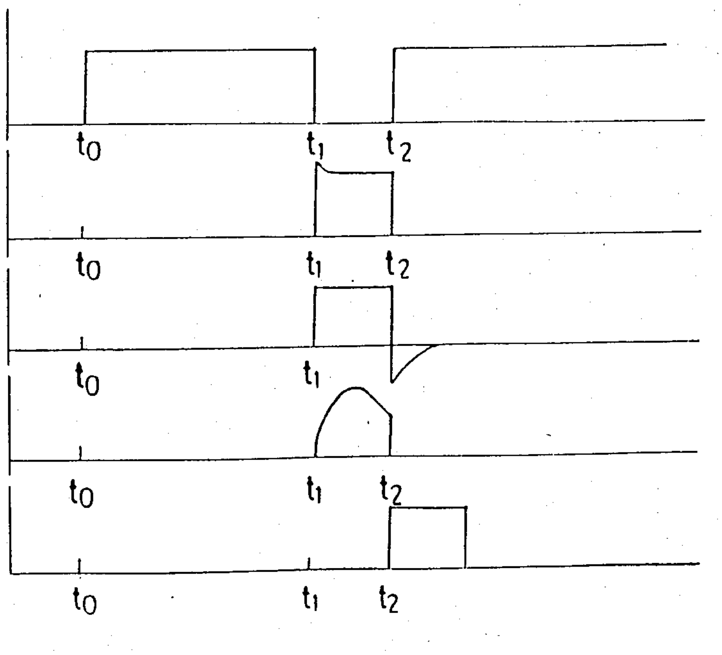

FIG. 6
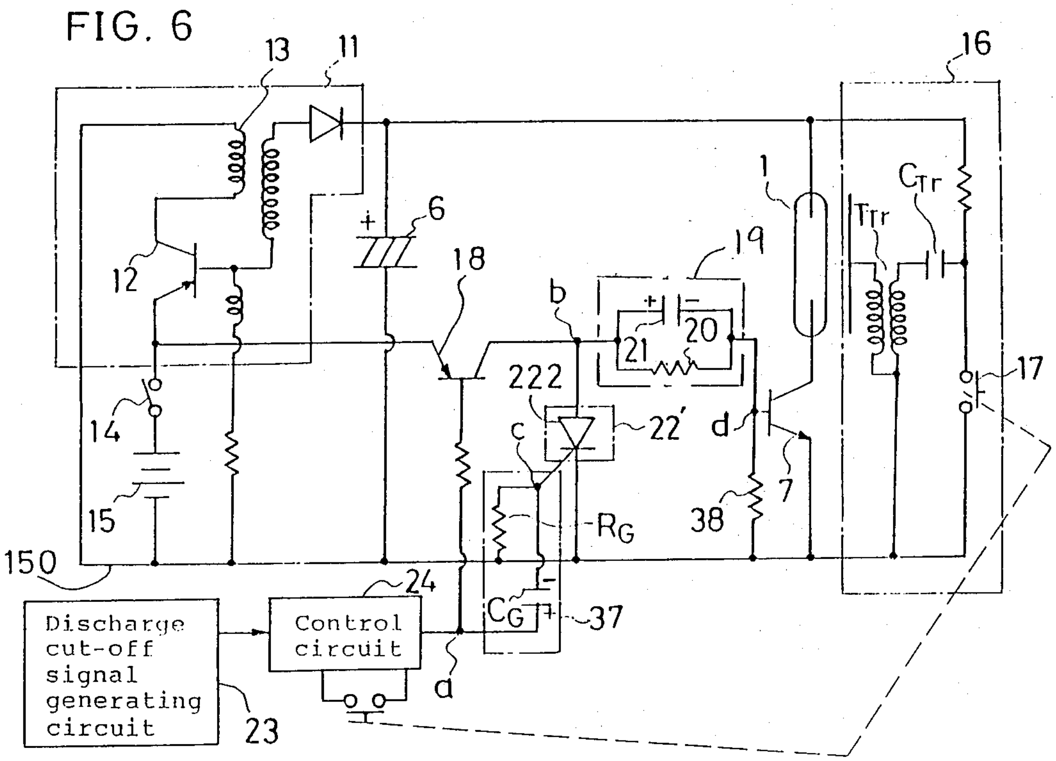
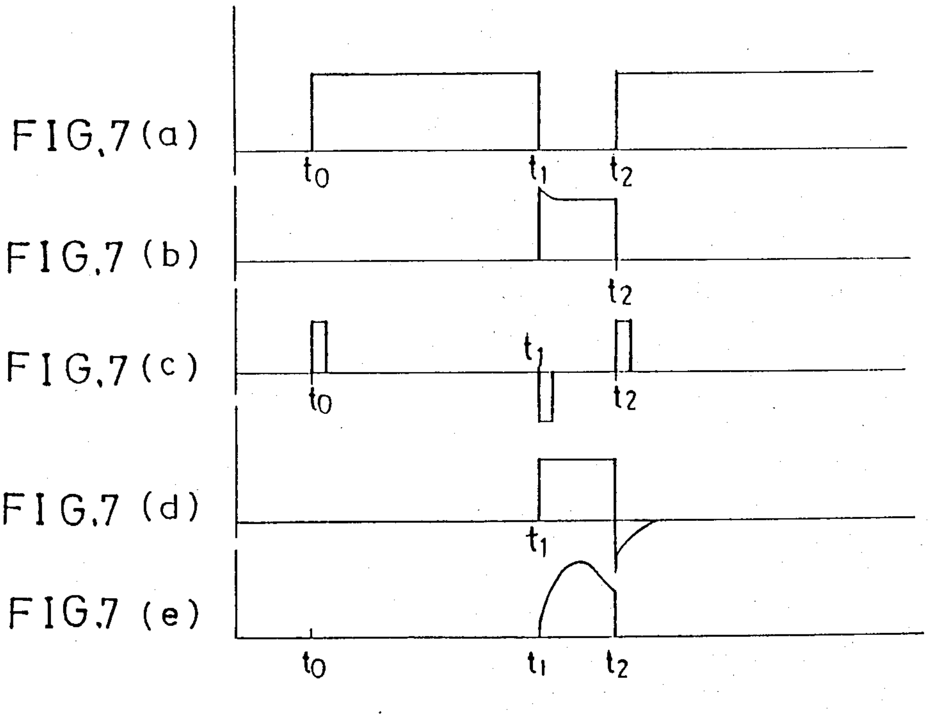

FIG. 11 (a) (Prior Art)
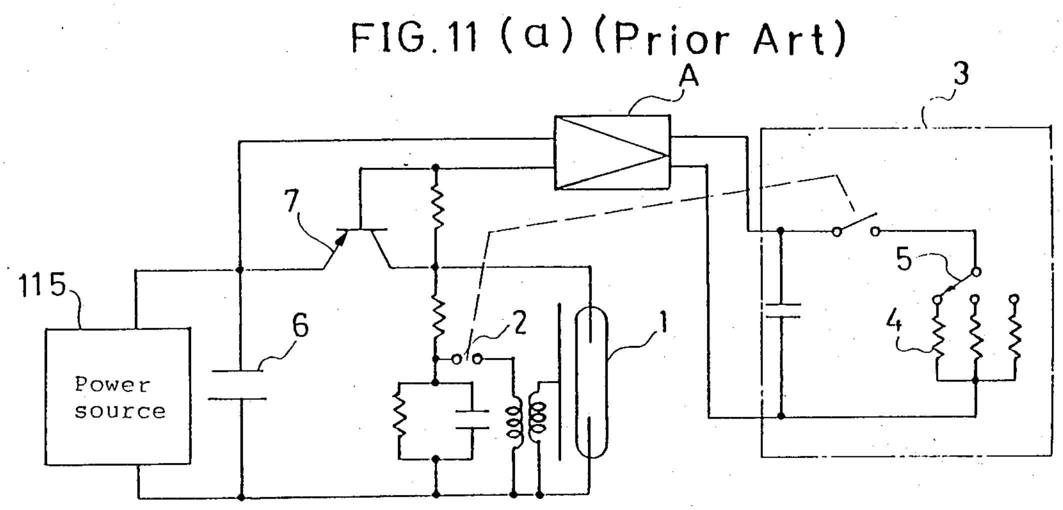
FIG. 11 (b) (Prior Art)
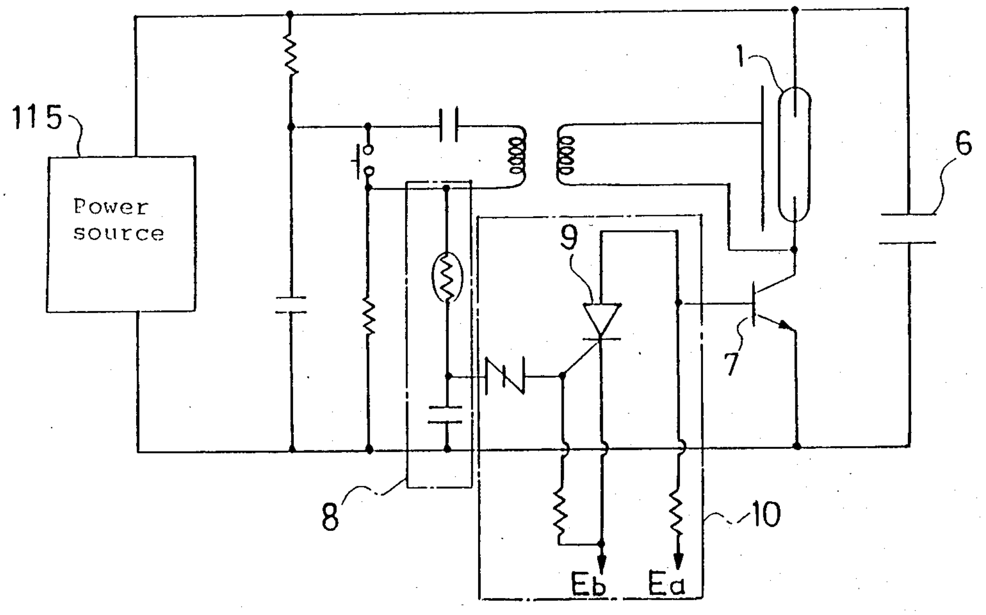

ELECTRIC FLASH DEVICE

FIELD OF THE INVENTION AND RELATED ART STATEMENT

1. Field of the Invention

The present invention relates generally to an electric flash device for photography, and more particularly to an electric flash device using a transistor as a switching device.

2. DESCRIPTION OF THE RELATED ART

Electric flash devices using a transistor as a switching device connected in series with a flash tube are disclosed in, for example, the published examined utility model application No. Sho 43-21344, and the published examined utility model application No. Sho 48-34646.

As shown in FIG. 11(*a*), the electric flash device disclosed in the prior art of the published examined utility model application No. Sho 43-21344 comprises an integrating circuit 3 which starts integration when a trigger switch 2 is closed to discharge the flash tube 1, a switch means 5 for switching resistors 4 of the integrating circuit 3 and for varying a light intensity and a time period of discharge and a transistor 7 serially coupled between a main capacitor 6 and a flash tube 1. Therein, high speed switching action is accomplished by an electric signal from the integrating circuit 3 through an amplifier A when the integration in the integrating circuit 3 finished. The amplifier A includes a schmitt circuit.

On the other hand, an electric flash device disclosed in the published examined utility model application No. Sho 48-34646, as shown in FIG. 11(*b*), comprises a main capacitor 6, a flash tube 1 and a transistor 7 serially connected. Furthermore, it comprises a light sensing device 8, which detects a reflected light from an object illuminated by the light of the electric flash and other surrounding light and issues a signal when the sum of the detected light reaches a predetermined value and a control circuit 10 for controlling the transistor 7 through a thyristor 9 which is turned ON by the signal.

Other electric flash device in the prior art is disclosed in the U.S. Pat. No. 4,457,611. Therein, the electric flash device uses a transistor 11 for controlling a preliminary flash tube 8.

On the controlling mode of the transistor in the above mentioned conventional electric flash devices as shown in FIG. 11(*a*) and FIG. 11(*b*), the base current of the transistors 7 is always supplied during use of these electric flash devices.

Therefore in the prior art as shown in FIG. 11(*a*) and FIG. 11(*b*), a power consumption owing to the base current cannot be disregarded. Furthermore the OFF state of the transistor 7 must be held until the exciting state of the flash tube 1 terminates, because its conductive state is liable to again recover when inverse bias for the transistor 7 is released in case where the flash tube 1 is still in exciting state after its discharge.

The flash tube 1 has a certain dispersion in exciting characteristic due to various dispersions in fabrication. Therefore, a sufficient long period of OFF state of the transistor 7 must be maintained to prevent recovery of discharge, and a considerable power consumption is required in order to maintain OFF state of the transistor 7.

In the electric flash device in accordance with the U.S. Pat. No. 4,457,611, the transistor 11 is used to control discharge of the preliminary flash tube 8. Since the discharge current of the preliminary flash tube 8 is less than the main flash tube 9. If the circuit is applied to controlling of the discharge of the main flash tube 9 of a large current, the large current flows into the transistor of the circuit. Since internal resistance of the transistor is not sufficiently low at an initial stage when a pulse signal is applied to the base of the transistor from the control circuit, the transistor is liable to be broken. Furthermore, when the base current is cut-off in order to open the emitter-collector conduction of the transistor flowing the large current, a leak current flows due to a stray capacitance across the collector and emitter, and the transistor is liable to be broken.

OBJECT AND SUMMARY OF THE INVENTION

An object of the present invention is to provide an electric flash device for photography wherein a transistor is coupled in series to a flash tube and reliable ON and OFF operations thereof, a long service life of the flash tube is realized, and moreover, a power consumption is decreased.

A further object of the present invention is to provide an electric flash device wherein a commutation capacitor which is used in a conventional electric flash controller using a thyristor is not required. Hence repetition of flash radiation in high frequency is enabled.

An electric flash device in accordance with the present invention comprises:

a flash tube, a main capacitor connected in parallel with a high voltage power source, a first transistor connected in series with said flash tube for controlling discharge of an electric charge stored in the main capacitor, a second transistor connected across a low voltage power source and the base of the first transistor in series with a circuit of a parallel connection of a current restriction resistor and a capacitor, said second transistor being for controlling the base current thereof, a switching means connected across the base and the emitter of the first transistor through the parallel connection circuit of the current restriction resistor and the capacitor, a trigger circuit for exciting the flash tube by operation of a synchronous switch, a discharge cut-off signal generating circuit for generating a discharge cut-off signal upon detection of a predetermined accumulated amount of a light radiation, and a control circuit for controlling turning ON of the second transistor and for remaining OFF the switching means by closure of the synchronous switch, and for turning OFF the second transistor and for turning ON the switching means by receiving the discharge cut-off signal.

BRIEF DESCRIPTION OF THE DRAWINGS

FIG. 1 is a circuitry of a first embodiment of an electric flash device in accordance with the present invention.

FIG. 2(*a*), FIG. 2(*b*), FIG. 2(*c*), FIG. 2(*d*) and FIG. 2(*e*) are timing charts showing the operation of the first embodiment.

FIG. 6 is a circuitry of a third embodiment of the electric flash device in accordance with the present invention.

FIG. 7(*a*), FIG. (*b*), FIG. (*c*), FIG. (*d*) and FIG. 7(*e*) are timing charts showing the operation of the third embodiment.

FIG. 11(*a*) and FIG. 11(*b*) are the circuitries of the electric flash devices in the prior art.

DESCRIPTION OF THE PREFERRED EMBODIMENTS

Figure 3:
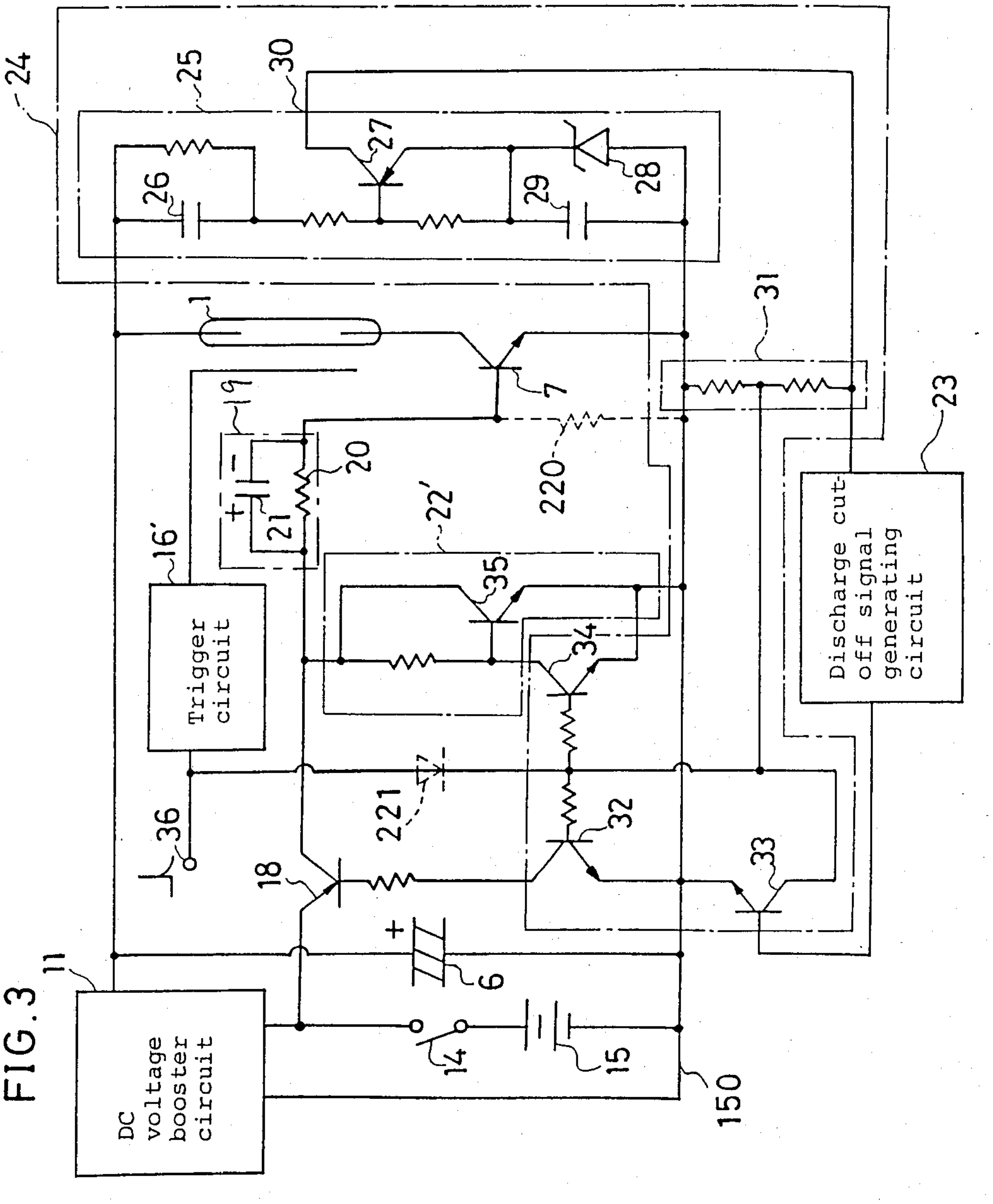
FIG. 3 is a circuitry of a second embodiment of the electric flash device in accordance with the present invention.

A first embodiment of an electric flash device for photography in accordance with the present invention is shown in FIG. 1. Referring to FIG. 1, a known DC voltage booster circuit 11 comprises an oscillation transistor 12, an oscillation transformer 13 and a diode 113. When a power switch 14 is closed, a DC electric power of a battery as a low voltage power source 15 is supplied to the DC voltage booster circuit 11. It converts the low voltage of the battery 15 to a high DC voltage (for example 300 V). The high DC voltage is applied to a main capacitor 6 connected across the cathode of the diode 113 and a ground line 150 connected to the negative terminal of the battery 15.

A known trigger circuit 16 comprises a synchronous switch 17 which is actuated by a shutter mechanism of a camera, a trigger capacitor $C_{Tr}$ for exciting a flash tube 1 by discharging thereof and a trigger transformer $T_{Tr}$ for transmitting trigger signal to a trigger electrode 111. One terminal of the flash tube 1 is connected with the collector of a first ransistor 7, and another terminal of the flash tube 1 is connected with the cathode of the diode 113. The emitter of the transistor 7 is connected with the ground line 150.

A second transistor 18 is connected in series with a parallelly connected circuit 19 which is formed by a capacitor 21 and a resistor 20 which acts as a current limiting device. The emitter of the transistor 18 is connected with the positive terminal of the battery 15 through the power switch 14. The collector "b" of the transistor 18 is connected with one of the two junctions of the parallelly connected circuit 19, and another junction is connected with the base "c" of the transistor 7.

A transistor 22 as a switching means is connected across the collector "b" and the ground line 150.

A discharge cut-off signal generating circuit 23 issues a signal for cutting off discharge of the flash tube 1 when the radiated light from the flash tube 1 reached to a desired value. A control circuit 24 which is operated by the synchronous switch 17 controls the transistors 18 and 22. The transistor 18 remains OFF. When the trigger circuit 16 is operated by the synchronous switch 17, the transistor 18 turns ON and the transistor 22 turns OFF. When the trigger circuit 16 is operated by the synchronous switch 17, the transistor 18 turns ON and the transistor 22 turns OFF. When the discharge cut-off signal from the discharge cut-off signal generating circuit 23 was applied to the control circuit 24, the transistor 18 turns OFF and the transistor 22 turns ON.

The above-mentioned discharge cut-off signal generating circuit 23 comprises a integrating circuit which issues a discharge control signal at end of the integrating operation synchronizing to the discharge, for example as shown by a reference numeral 3 in FIG. 11(*a*), and a light detecting device 10 as shown in FIG. 11(*b*) which issues the discharge control signal when the received reflected light from an object which is illuminated by the electric flash reached to a predetermined value.

Though the control circuit 24 applies the same control signal to the transistor 18 and the transistor 22 as shown in FIG. 1, the control circuit 24 can be formed so as to issue two independent signals for the transistor 18 and the transistor 22, respectively.

The operation of the first embodiment is shown by timing charts of FIG. 2(*a*)–FIG. 2(*e*).

The power switch 14 is closed at a time "$t_0$", the DC voltage booster circuit 11 is activated. The output of the DC voltage booster circuit 11 is applied to the main capacitor 6 and the trigger capacitor $C_{Tr}$, and hence they are charged. On the other hand, the control circuit 24 remains normal state by closing of the power switch 14 as shown by a wave-form of FIG. 2(*a*).

The output voltage of the control circuit 24 at a junction "a" is applied to the base of the transistor 18, 22. The transistor 18 remains OFF. Since the voltage applied to the collector of the transistor 22 is zero at the time "$t_0$", the current does not flow through the transistor 22. After completion of charging to the main capacitor 6, when the synchronous switch 17 is closed at a time $t_1$, the electric charge of the capacitor $C_{Tr}$ of trigger circuit 16 is discharged through the primary winding 166 of the transformer $T_{Tr}$, hence the flash tube 1 is excited by a voltage induced in the secondary winding 167. Simultaneously, the control circuit 24 is activated by the synchronous switch 17 and varies the voltage at the junction "a". The voltage of the junction "a" becomes zero at the time "$t_1$" as shown in FIG. 2(*a*) and remains zero until issuance of the discharge cut-off signal from the discharge cut-off signal generating circuit 23. Hence, the transistor 22 turns OFF and the transistor 18 turns ON, and DC voltage of the battery 15 is applied to the base of the transistor 7 through the transistor 18, the parallelly connected resistor 20 and capacitor 21. A wave-form of the base current of the transistor 7 at a junction "b" is shown in FIG. 2(*b*). The wave-form steeply rise at the time "$t_1$" since the capacitor 21 is charged by the base current, consequently the transistor 7 certainly and rapidly turns ON. After the capacitor 21 was fully charged, the base current is restricted to a predetermined value by the resistor 20. Hence A suitable forward base current flows into the base of the transistor 7.

A wave-form of the base current at the base "c" of the transistor 7 is shown in FIG. 2(*c*). When the transistor 7 turned ON, the electric charge of the capacitor 6 is discharged in the flash tube 1 and a current flows along a dotted line L through the transistor 7, and the flash light is radiated. When the forward base current of the transistor 7 is sufficiently large, the wave-form of the current of the flash tube 1 is shown in FIG. 2(*d*).

After the start of the discharge of the flash tube 1, for example, a light sensing device provided in the discharge cut-off signal generating circuit 23 detects the reflected light from the object. When the sum of the detected light by the light sensing device reached a preset value at a time $t_2$, the discharge cut-off signal generating circuit 23 issues a discharge cut-off signal, and applies it to the control circuit 24. The control circuit 24 issues a signal which rises the voltage of the junction point "a". Consequently, the transistor 18 turns OFF, and the transistor 22 turns ON. Therefore, the forward base current of the transistor 7 is shut off, and the collector "b" of the transistor 18 becomes conductive to the ground line 150 through the transistor 22.

The electric charge in the capacitor 21 is discharged through the resistor 20 after the time $t_2$, and a voltage is developed across the resistor 20. The voltage is applied across the base and the emitter of the transistor 7 as a reverse bias voltage through the transistor 22 as shown in FIG. 2(*c*). Hence, a leak current of the transistor 7 due to a stray capacitor between the collector and the emitter is shut off, and the transistor 7 rapidly and perfectly turns OFF. Consequently, the current flowing in the flash tube 1 is cut-off at the time $t_2$ and the light radiation therefrom stops as shown in FIG. 2(*d*).

In the above-mentioned embodiment, the output signal of the control circuit 24 corresponds to the action of the synchronous switch 17 and the discharge cut-off signal. As the other method, though output signal of the control circuit 24 for turning ON the transistor 7 is produced by the operation of the synchronous switch 7, the turning OFF of the transistor 7 can be achieved by a pulse signal produced in the control circuit 24 as shown in FIG. 2(*e*).

A second embodiment of the electric flash device according to the present invention is shown in FIG. 3. In this embodiment, a flash tube 1, a capacitor 6, a transistor 7, a DC voltage booster circuit 11, a power switch 14, a battery 15, a transistor 18, a resistor 20, a capacitor 21 and a discharge cut-off signal generating circuit 23 are identical with the devices which are designated by the same numerals in the first embodiment, respectively.

The trigger circuit 16' is a known and is disclosed, for example, in the U.S. Pat. No. 4,095,141. A well-known voltage generating circuit 25 comprises two capacitors 26 and 29, a transistor 27 and a zener diode 28.

The DC voltage booster circuit 11 generates a high voltage DC output. The high voltage DC output is applied to the capacitors 6, 26 and 29, and they are charged. The transistor 32 remains OFF until a trigger signal is imputed to a input terminal 36, and hence, the transistor 18 remains OFF and the transistors 34 and 35 also remain OFF until that time. In a full charged state of the main capacitor 6, the trigger circuit 16' is actuated by the trigger signal inputted to the input terminal 36 and transistor 32 rapidly turns ON. Consequently, the transistors 18 and 34 turn ON and the transistor 35 turns OFF, and the base current of the transistor 7 is supplied through the parallelly coupled capacitor 21 and resistor 20. Then the transistor 7 turns ON and the flash tube 1 discharges and radiates a light. Consequently, the electric charge stored in the capacitor 26 is discharged through the flash tube 1. As a result, a forward base current flows into the base of the transistor 27 and it turns ON. On the other hand, the electric charge stored in the capacitor 29, voltage of which is held to a constant value by the zener diode 28 connected in parallel discharges output through the collector 30 of the transistor 27, and the resultant current is applied to the discharge cut-off signal generating circuit 23. The output of the transistor 27 is divided by a dividing means 31 formed by two resistors connected in series. The control circuit 24 in the embodiment comprises the voltage generating circuit 25, the dividing means 31 and three transistors 32, 33 and 34.

A diode 221 as shown by a dotted line can be inserted between the input terminal 36 and the collector of the transistor 33 in order to prevent flowing of a reverse current. When the output voltage of the voltage generating circuit 25 is not so high, the dividing means 31 can be excluded. The constant output voltage applied to the dividing means 31 is divided by two resistors and is applied across the bases and the emitters of the transistors 32 and 34. The transistors 32 and 34 turn ON by the trigger signal from the input terminal 36 and remain ON after disappearance of the trigger signal due to the output voltage of the transistor 27. Hence the transistor 18 remains ON and the transistor 35 remains OFF, thereby the base current of the transistor 7 is supplied. Consequently, the transistor 7 remains ON, and the flash tube remains discharge.

When the sum of the radiatd light reached to a predetermined value, a discharge cut-off signal is issued from the discharge cut-off signal generating circuit 23. The transistor 33 turns ON by the discharge cut-off signal, and it shortcircuits across the bases and the emitters of the transistor 32 and 34. Hence the transistor 32 and 34 turn OFF. Consequently, the transistor 18 turns OFF and the transistor 35 of the switch means 22' turns ON. Then transistor 7 immediately turns OFF since the base current thereof is cut-off and the reverse bias base voltage is given due to the discharge of the capacitor 21. And the discharge of the flash tube 1 is cut-off and the light radiation stops.

In order to stabilize the operation of the transistor 7, connection of a resistor 220 across the base and the emitter of the transistor 7 is recommended as mentioned in the first embodiment.

Figure 4:
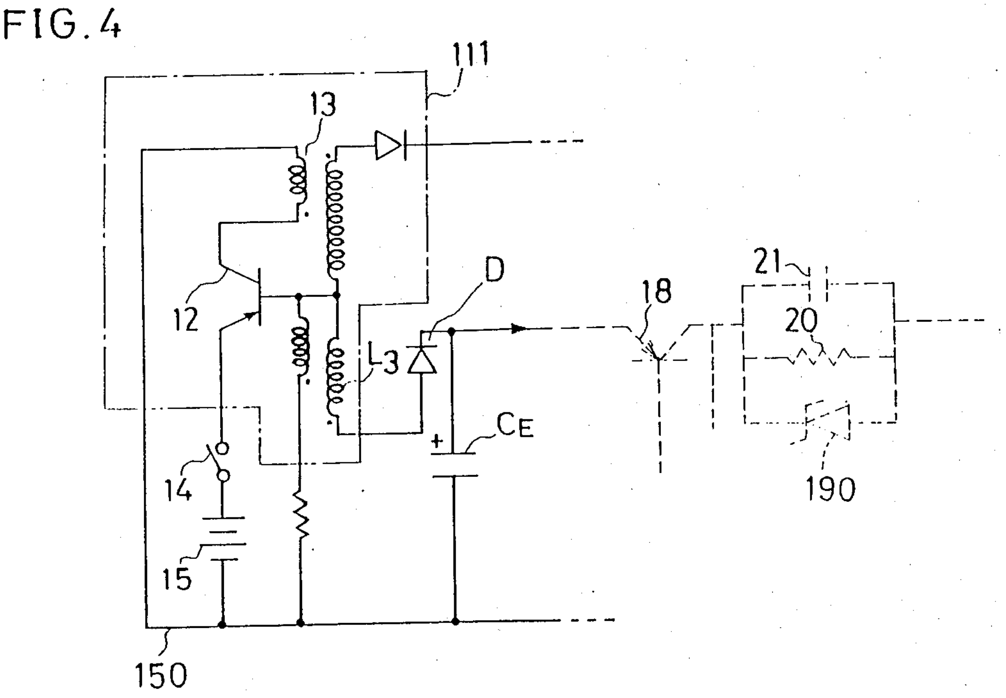
FIG. 4 is a circuitry of an example of a DC voltage booster circuit which is usable in the electric flash device in accordance with the present invention.

In the first and the second embodiments as shown in FIG. 1 and FIG. 3, respectively, the base current of the transistor 7 is directly supplied from the battery 15 as the low voltage power source. An example of a DC voltage booster circuit for supplying a base current of the transistor 7 is shown in FIG. 4 wherein associated circuits only are shown and other are omitted. Referring to FIG. 4, the oscillation transformer 13 provides an auxiliary winding $L_3$. An induced voltage in the winding $L_3$ is rectified by a diode D and is supplied to the base of the transistor 7 through the transistor 18 and the parallelly coupled resistor 20 and capacitor 21. A filter capacitor $C_E$ is connected across the emitter of the transistor 18 and the ground line 150 and is charged by the output of the winding $L_3$.

In this example, since the voltage applied to the parallelly coupled resistor 20 and capacitor 21 is higher than the voltage of the battery 15, when the reverse vias voltage is applied to the base of the transistor 7, the transistor 7 is liable to be broken. Then connection of a zener diode 190, which has a preferable zener breakover voltage and is connected in parallel to the capacitor 21 as shown in FIG. 4 by a dotted line, is recommendable to prevent breakdown of the transistor 7.

Figure 5:
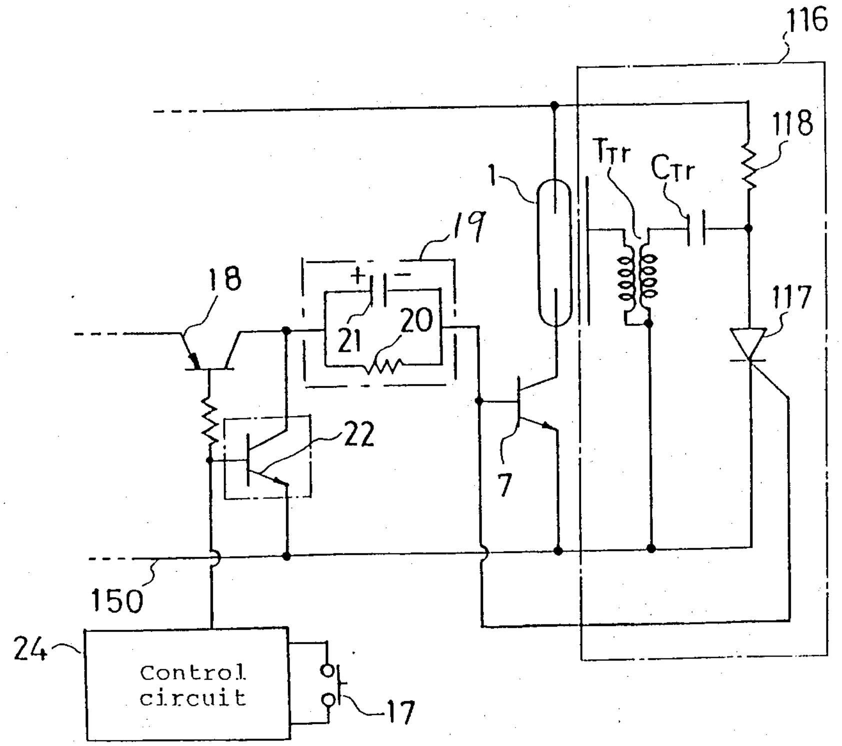
FIG. 5 is a circuitry of an example of a trigger circuit which is usable in the electric flash device in accordance with the present invention.

Instead of the synchronous switch 17 of FIG. 1 in the trigger circuit 16 of the first embodiment, in a modified example of FIG. 5, a thyristor 117 may be used in the trigger circuit 116, by connecting the cathode of the thyristor 117 with the ground and the anode thereof to the high voltage power source (not shown) through a resistor 118. A capacitor $C_{Tr}$ is connected between the anode and one terminal of a primary winding of the trigger transformer $T_{Tr}$. The other terminal of the primary winding is connected with the ground line 150. The gate is connected to the base of the transistor 7. The control circuit 24 is activated by the synchronous switch 17.

A third embodiment of the electric flash device according to the present invention is shown in FIG. 6. In this embodiment, a thyristor 222 is used as the switch means 22'. A gate circuit 37 comprises a resistor $R_G$ connected across the gate of the thyristor 222 and the ground line 150, and a capacitor $C_G$ connected between the gate of the thyristor 222 and the output terminal of the control circuit 24. The wave-form in operation of the embodiment is shown in FIG. 7. The charging of the main capacitor 6 starts by a closure of the power switch 14 at a time $t_0$. At that time an output terminal "a" of the control circuit 24 rise to a predetermined voltage and the predetermined voltage remains until a time $t_1$. Hence the transistor 18 remains OFF from $t_0$ to $t_1$. The wave-form of the voltage of the output terminal "a" is shown in FIG. 7(*a*). The capacitor $C_G$ of the gate circuit 37 is charged with a polarity as shown in FIG. 6. A pulse signal as shown in FIG. 7(*c*) is applied to a gate "c" of the thyristor 222 at the time $t_0$, but the thyristor 222 does not turn ON, since the transistor 18 remains OFF.

When the synchronous switch 17 closes in the full charged state of the main capacitor 6, the trigger circuit 16 is activated by discharging of the capacitor $C_{Tr}$ and the discharge tube 1 is excited. Simultaneously the output "a" of the control circuit 24 turns zero at a time $t_1$ as shown in FIG. 7(*a*). Hence, the transistor 18 turns ON, and the voltage of the battery 15 is supplied to the gate of the transistor 7 through the transistor 18 and the circuit of parallelly coupled resistor 20 and capacitor 21. The voltage of the collector of the transistor 18 is shown in FIG. 7(*b*). The transistor 7 is applied with a forward base bias voltage as shown in FIG. 7(*d*) and turns ON at the time $t_1$. Hence, the discharge tube 1 discharges and radiates the flash light. At this time $t_1$, the electric charge stored in the capacitor $C_G$ in a polarity as shown in FIG. 6 is discharged, and a pulse of reverse polarity to the pulse issued at the time $t_0$ is generated at the time $t_1$ at the gate "c", as shown in FIG. 7(*c*), the thyristor 222 still remains OFF at the time $t_1$.

When the discharge cut-off signal from the discharge cut-off signal generating circuit 23 is applied to the control circuit 24 at a time $t_2$, the output voltage of the control circuit 24 rises at the time $t_2$ as shown in FIG. 7(*a*), and the transistor 18 turns OFF. And the current flowing in the junction "b" is shut off at the time $t_2$ as shown in FIG. 7(*b*). Simultaneously, a pulse is generated at the gate "c" of the thyristor 222 at the time $t_2$ as shown FIG. 7(*c*), and the thyristor 222 turns ON. The charge stored in the capacitor 21 is discharged from the time $t_2$ through the thyristor 222, the resistor 20 and the bias resistor 38, and a reverse bias voltage is applied across the base and the emitter of the transistor 7 as shown in FIG. 7(*d*). Consequently, the transistor 7 rapidly and certainly turns OFF, and light radiation of the flash tube 1 is shut off. When a sufficient base current is applied to the transistor 7 through the transistor 18, a wave-form of the collector current flowing through the transistor 7 is shown in FIG. 7(*e*).

Furthermore, the DC voltage booster circuit as shown in FIG. 4 and the trigger circuit 116 as shown in FIG. 5 can be also combined with this embodiment.

Figure 8:
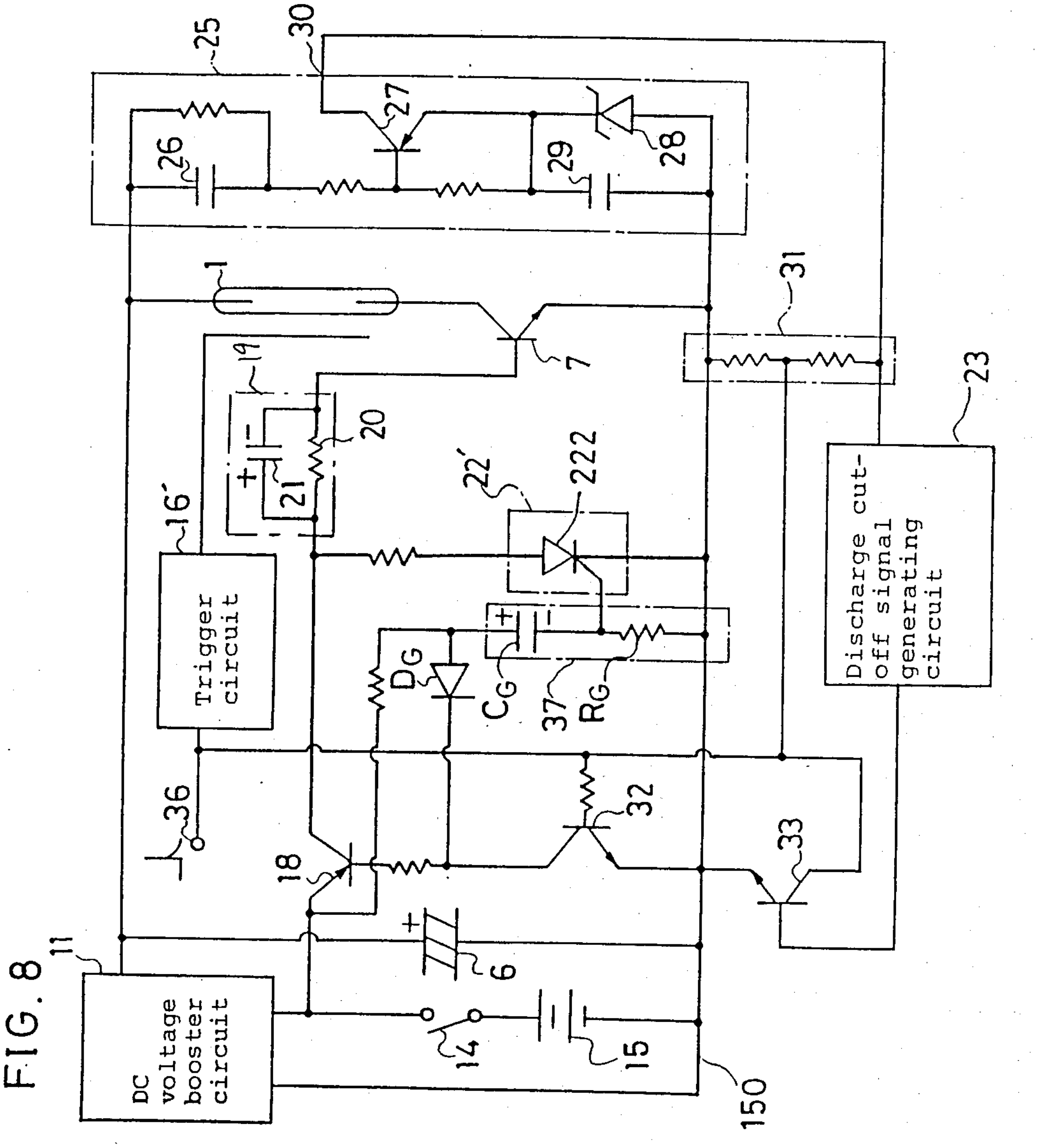
FIG. 8 is a circuitry of a fourth embodiment of the electric flash device in accordance with the present invention.

In the embodiment of FIG. 3, instead of the transistor 35 a thyristor can be used as the switching device 22'. An embodiment using the thyristor 222 as the switching device 22' is shown in FIG. 8. Referring FIG. 8, a capacitor $C_G$ of a gate circuit 37 of the thyristor 222 is charged in the polarity as shown in FIG. 8 when the power switch 14 is closed. The electric charge of the capacitor $C_G$ is discharged through a diode $D_G$ and a transistor 32 when the transistor 32 turns ON. When the transistor 32 turned OFF in order to cut-off discharge of the flash tube 1, the capacitor $C_G$ is charged again in the polarity as shown in FIG. 8. At this time, the thyristor 222 turns ON by discharging of the charged voltage of the capacitor 21, thereby the reverse bias base voltage is applied to the base of the transistor 7.

In the embodiment, the DC voltage booster circuit 111 as shown in FIG. 4 can be combined.

Figure 9:
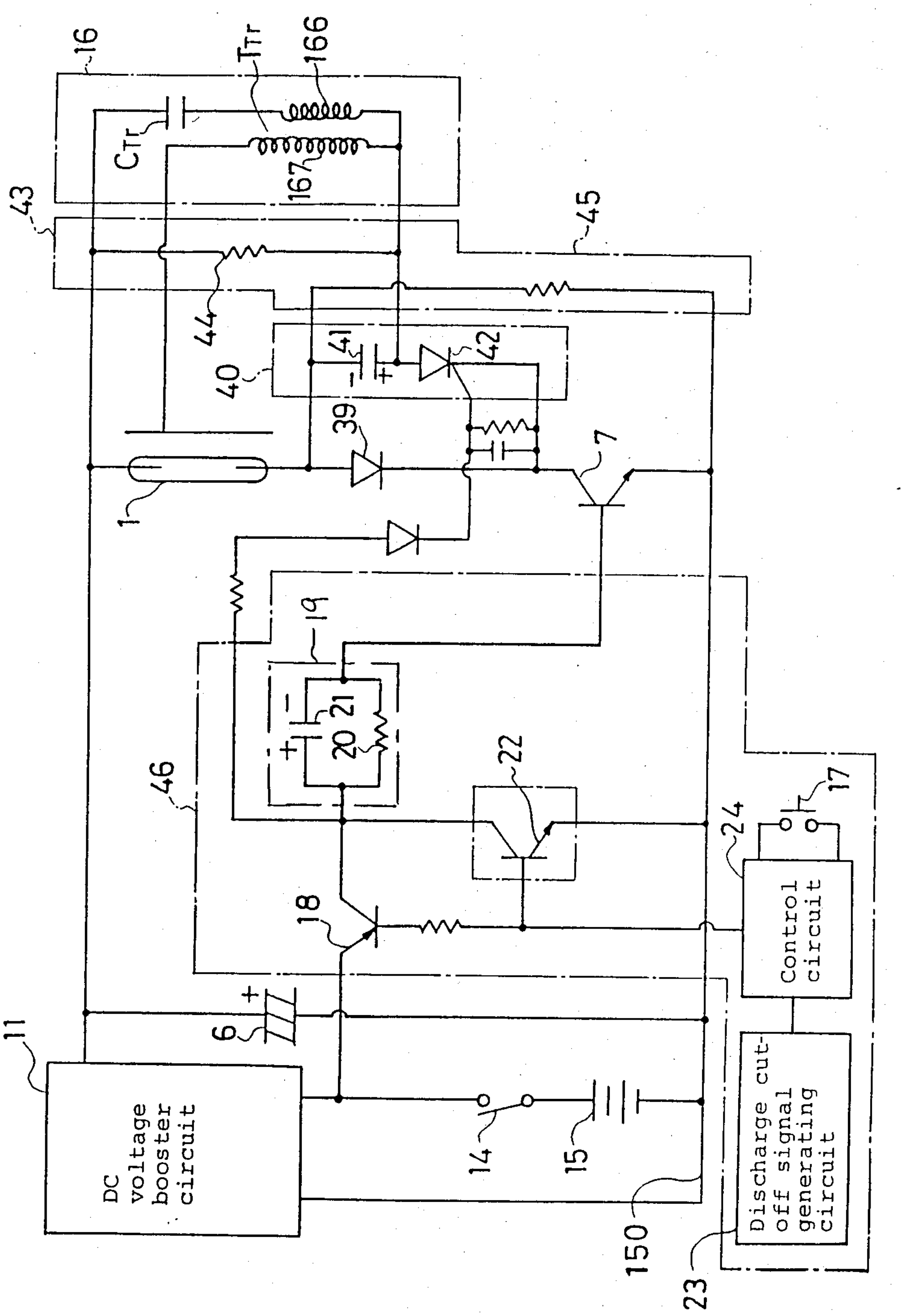
FIG. 9 is a circuitry of a fifth embodiment of the electric flash device in accordance with the present invention.

A fourth embodiment of the electric flash device according to the present invention is shown in FIG. 9. Referring to FIG. 9, respective devices designated by the same numerals as shown in FIG. 1 are identical with them.

Generally, a flash tube 1 is heated by repeated discharge operation in a high frequency. Hence a discharge starting voltage of the flash tube rises, and difficulty of triggering of the flash tube increases. In this case, as is well known, application of a higher voltage to the flash tube than ordinary use is effective. In the embodiment, a doubled voltage of the charged voltage of the main capacitor 6 is applied to the flash tube 1. In FIG. 9, a diode 39 is connected to the flash tube 1 with its anode and is connected to the collector of the transistor 7 with its cathode. The serially connected circuit 40 is formed by a capacitor 41 and a thyristor 42. The positive terminal of the capacitor 41 is connected with the anode of the thyristor 42. The negative terminal of the capacitor 41 is connected with the anode of the diode 39, and the cathode of the diode 42 is connected with the cathode of the diode 39. The capacitor 41 acts as a voltage doubler. A charge means 43 comprises resistors 44 and 45.

When the power switch 14 is closed, the main capacitor 6 is charged, and the capacitor 41 is also charged through the resistors 44 and 45 in a polarity as shown in FIG. 9. The control circuit 24 issues a signal for turning ON the transistor 7 and the thyristor 42 when the synchronous switch 17 is closed. At first, the transistor 7 turns ON, and consequently the thyristor 42 turns ON. The charge stored in the capacitor 41 is supplied serially to the voltage of the capacitor 6 to the flash tube 1 through the thyristor 42 and transistor 7. Furthermore, the trigger capacitor $C_{Tr}$ is charged through the primary winding 166 of the trigger transformer $T_{Tr}$. A high voltage induces in the secondary winding 167 of the trigger transformer $T_{Tr}$, and is applied to a trigger electrode 111. Since the charged voltage in the capacitor 41 is almost equal to that of the main capacitor 6, the doubled voltage is applied to the flash tube 1 and it radiates the light. When a discharge cut-off signal issued from the discharge cut-off signal generating circuit 23, the transistor 7 and the thyristor 42 turn OFF and the discharge of the flash tube 1 is shut off. According to the embodiment, since the high voltage such as doubled voltage of that of the charged voltage of the main capacitor 6 is applied to the flash tube 1, even if the flash tube 1 is heated due to repetition of the dischargings and the discharge start voltage rises, reliable operation is realized. Therefore, the embodiment is suitable for repetition of the discharge in high frequency.

Since the thyristor 42 remains OFF except for a period of the discharge of the flash tube 1, if the leakage of the current across the collector and the emitter of the transistor 7 exists, the electric charge of the capacitor 41 does not leak through the transistor 7.

Figure 10:
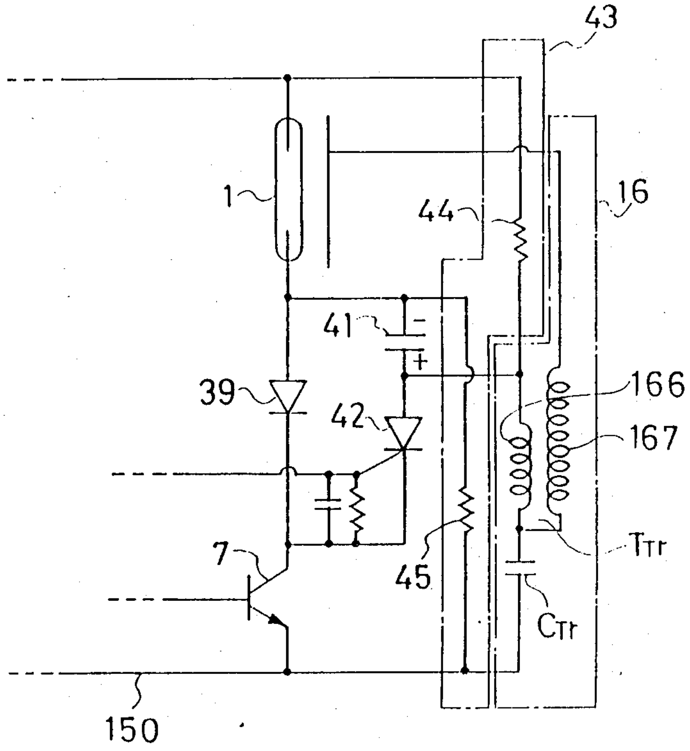
FIG. 10 is a circuitry of a sixth embodiment of the electric flash device in accordance with the present invention.

Though trigger operation of the flash tube 1 in the embodiment is operated by charging of the capacitor $C_{Tr}$, still other example of the trigger circuit as shown in FIG. 10 wherein associated circuits only are shown and other are omitted can be applied to this embodiment. Referring to FIG. 10, a terminal of the primary winding 166 of the trigger transformer $T_{Tr}$ is connected with a terminal of the capacitor $C_{Tr}$, the other terminal of the winding is connected with the anode of the thyristor 42 and is connected with the high voltage power source through the resistor 44. The other terminal of the capacitor $C_{Tr}$ is connected with the ground line 150. The secondary winding 167 is connected with the junction point of the primary winding 166 and the capacitor $C_{Tr}$. Since the capacitor $C_{Tr}$ is charged through the resistor 44, when the transistor 7 turned ON, the flash tube is triggered by discharging of the capacitor $C_{Tr}$.

A control part 46 is almost identical with the first embodiment. Furthermore the circuits for controlling the transistor 7 as shown in FIG. 3 and FIG. 6 are also applied to the fourth embodiment.

Although the invention has been described in its preferred form with a certain degree of particularity, it is understood that the present disclosure of the preferred form has been changed in the details of construction and the combination and arrangement of parts may be resorted to without departing from the spirit and the scope of the invention as hereinafter claimed.

What is claimed is:

1. An electric flash device comprising:

a flash tube, a main capacitor connected in parallel with a high voltage power source, a first transistor connected in series with said flash tube for controlling discharge of an electric charge stored in the main capacitor, a second transistor connected across a low voltage power source and the base of said first transistor in series with a circuit of a parallel connection of a current restriction resistor and a capacitor said second transistor being for controlling the base current thereof, a switching means connected across the base and the emitter of said first transistor through the parallel connection of the current restriction resistor and the capacitor, a trigger circuit for exciting said flash tube by operation of a synchronous switch, a discharge cut-off signal generating circuit for generating a discharge cut-off signal upon detection of a predetermined accumulated amount of a light radiation, and a control circuit for controlling turning ON of said second transistor and for remaining OFF said switching means by closure of said synchronous switch, and for turning OFF said second transistor and for turning ON said switching means by receiving said discharge cut-off signal.

2. An electric flash device in accordance with claim 1, wherein said switching means is a transistor.

3. An electric flash device in accordance with claim 1, wherein said switching means is a thyristor whose gate is connected to a junction point of a serially connected resistor and capacitor, opposite terminal of the resistor to said junction point being connected with a second terminal of said low voltage power source and a control signal from said control circuit is applied to opposite terminal to said junction point of said capacitor.

4. An electric flash device in accordance with claim 1, wherein said trigger circuit further comprises a thyristor whose gate is connected with the base of said first transistor.

5. An electric flash device in accordance with claim 1, wherein the emitter of said second transistor is connected with an output of a DC voltage booster circuit for converting said low voltage power source.

6. An electric flash device in accordance with claim 1, wherein said trigger circuit is activated by a trigger signal generated by closure of the synchronous switch, said switching means is a third transistor, and said control circuit comprises:

a fourth transistor connected between the base of the second transistor and the second terminal of the low voltage power source, to be turned ON by said trigger signal for turning ON said second transistor, a fifth transistor connected across the base and the emitter of said third transistor, to be turned ON by said trigger signal for turning OFF and third transistor, a voltage generating circuit which generates a predetermined voltage by discharge of said flash tube and holds ON state of said forth transistor and said fifth transistor during discharging of the flash tube by application of said predetermined voltage as base bias, and a sixth transistor which is turned ON by a discharge cut-off signal of said discharge cut-off signal generating circuit and shortcircuits across the bases and the emitters of said fourth transistor and said fifth transistor.

7. An electric flash device in accordance with claim 1, wherein said trigger circuit is a circuit to be activated by a trigger signal generated by closure of the synchronous switch and said switching means is a thyristor and said control circuit comprises a fourth transistor connected between the base of the second transistor and the second terminal of the power source and which is turned ON by said trigger signal for turning ON said second transistor, a gate circuit formed by a serial connection of capacitor and resistor wherein said opposite terminal of the capacitor is connected with the first terminal of the low voltage power source, another terminal of the resistor is connected with the second terminal of the power source and said junction point is connected with the gate of said thyristor, a diode connected to the base of said second transistor with its cathode and connected to the junction of the power source and said gate circuit with its anode, for discharging the electric charge of the capacitor of said gate circuit in ON state of said fourth transistor, a voltage generating circuit which generates a predetermined voltage by discharging of said flash tube and hold ON state of said fourth transistor during discharging of the flash tube by applying said predetermined voltage as a base bias, and a sixth transistor which turns ON by a discharge cut-off signal of said discharge cut-off signal generating circuit and shortcircuits across the base and the emitter of said fourth transistor.

8. An electric flash device comprising:

a first circuit formed by a serially connected flash tube, diode and first transistor in the named order and connected in parallel with a main capacitor which is to be charged by a high voltage power source, a second circuit formed by a serial connection of capacitor and a thyristor, connected in parallel with said diode, a charging means for charging said capacitor in a manner to serially add charged voltage of said capacitor to the voltage of the main capacitor through the thyristor and the first transistor, a trigger circuit comprising a capacitor and trigger transformer and for triggering said flash tube through said thyristor and the first transistor, a control part for synchronously controlling said thyristor and said first transistor, and a coupling means which comprises a serially connected resistor and diode and for transmitting a control signal from said control circuit to the gate of said thyristor.

9. An electric flash device in accordance with claim 8, wherein said control circuit comprising:

a third circuit which comprises a serially connected second transistor and a circuit of parallel connection of current restricting device and capacitor is connected between the first terminal of the power source and the base of the first transistor by connecting the emitter of the second transistor with the power source, a switching means connected across the base and emitter of the first transistor through said parallel connection circuit of the current restricting device and the capacitor, a discharge cut-off signal generating circuit for outputting a discharge cut-off signal by detection of a predetermined accumulated amount of light radiation from the flash tube, and a control circuit for turning ON said second transistor and for holding said switching means in OFF state in compliance with operation of the synchronous switch, and for turning OFF said second transistor and for turning ON said switching means by receiving of said discharge cut-off signal.

10. An electric flash device in accordance with claim 8, wherein said trigger circuit comprises a serial connection circuit of a trigger capacitor and a primary winding of a trigger transformer, connected across both terminals of said main capacitor, through the thyristor and the first transistor.

11. An electric flash device in accordance with claim 8, wherein said trigger circuit comprises a serially connected circuit of the trigger capacitor and the primary winding of the trigger transformer, connected across the serially connected circuit of the thyristor and the first transistor.

* * * * *